(12) United States Patent
Sato

(10) Patent No.: US 7,663,469 B2
(45) Date of Patent: Feb. 16, 2010

(54) THERMISTOR DEVICE AND METHOD FOR MANUFACTURING THE SAME

(75) Inventor: Kazuo Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 485 days.

(21) Appl. No.: 11/562,212

(22) Filed: Nov. 21, 2006

(65) Prior Publication Data

US 2007/0132541 A1    Jun. 14, 2007

(30) Foreign Application Priority Data

Dec. 9, 2005    (JP)    ............................... 2005-357023

(51) Int. Cl.
*H01C 7/13*    (2006.01)

(52) U.S. Cl. .................................................. 338/22 R

(58) Field of Classification Search ................ 338/22 R
See application file for complete search history.

(56) References Cited

U.S. PATENT DOCUMENTS 5,222,811 A * 6/1993 Miyoshi ..................... 374/208
5,749,656 A * 5/1998 Boehm et al. ............... 374/185

FOREIGN PATENT DOCUMENTS

| CN | 1447352 A | 10/2003 |
| JP | 60-15783 U | 2/1985 |
| JP | 4-319634 | 11/1992 |
| JP | 8-50061 | 2/1996 |
| JP | 2004-179551 A | 6/2004 |

* cited by examiner

*Primary Examiner*—Elvin G Enad
*Assistant Examiner*—Joselito Baisa
(74) *Attorney, Agent, or Firm*—Oblon, Spivak, McClelland, Maier & Neustadt, L.L.P.

(57) ABSTRACT

A thermistor device includes a thermistor element unit with a lead conductor and a terminal plate welded outside a plate portion thereof to a distal end of the lead conductor.

6 Claims, 7 Drawing Sheets

THERMISTOR DEVICE AND METHOD FOR MANUFACTURING THE SAME

BACKGROUND OF THE INVENTION

1. Field of the Invention

The present invention relates to a thermistor device and a method for manufacturing the same.

2. Description of the Related Art

Thermistor devices, which have been used as a temperature sensor in household appliances, housing equipments, automotive equipments and the like, are generally composed of a thermistor element unit and a terminal plate. The thermistor element unit is assembled with a thermistor element disposed between two dumets, and the assembly is sealed by a glass body. Moreover, a lead conductor attached to the dumet is electrically connected to a terminal plate.

Thermistor devices of this type are basically required to have a tight joint between the lead conductor and the terminal plate. This is because if the mechanical joint strength between the lead conductor and the terminal plate is insufficient, mechanical or thermal stress externally applied to the thermistor device tends to cause a gap due to separation or breakage at the joint between the lead conductor and the terminal plate, leading to the separation problem of the lead conductor. If such a gap or the separation problem of the lead conductor occurs, the thermistor element unit becomes electrically open from the terminal plate, impairing the function and reliability as a temperature sensor.

Concerning the joint between the lead conductor and the terminal plate in the prior art, for example, Japanese Patent No. 3039277 discloses a thermistor device in which the lead conductor and the terminal plate are joined together by soldering. On the other hand, Japanese Patent No. 2601046 discloses a thermistor device in which the lead conductor and the terminal plate are joined together by caulking and then electric resistance welding.

However, because soldering disclosed in Japanese Patent No. 3039277 cannot provide sufficient mechanical joint strength between the lead conductor and the terminal plate, mechanical or thermal stress externally applied thereto tends to cause a gap due to separation or breakage at the joint therebetween, leading to the separation problem of the lead conductor.

Moreover, because soldering in the process of manufacturing precision electronics devices of this type is generally performed by a reflow method using a furnace, the thermistor element may react to heating at the time of reflow soldering, deteriorating in thermistor characteristics.

Furthermore, lead contained in solder is now known to cause an environmental issue, which requires us to restrain ourselves from using lead solder or to meet use restrictions such as switching over to lead-free solder.

On the other hand, because electric resistance welding disclosed in Japanese Patent No. 2601046 requires the lead conductor to be pressed against the terminal plate, the stress upon assembly may put a burden on the lead conductor and the terminal plate, deteriorating the reliability. In addition, pressing the lead conductor against the terminal plate tends to cause a displacement when these components come into contact with each other upon assembly, impairing the function and reliability as a temperature sensor.

SUMMARY OF THE INVENTION

It is an object of the present invention to provide a thermistor device in which a lead conductor and a terminal plate can be firmly and reliably joined together without affecting thermistor characteristics, and a method for manufacturing the thermistor device.

It is another object of the present invention to provide a thermistor device with high reliability, and a method for manufacturing the thermistor device.

According to a first aspect of the present invention, there is provided a thermistor device comprising:

a thermistor element unit with a lead conductor; and a terminal plate welded outside a plate portion thereof to a distal end of the lead conductor.

In the thermistor device of the present invention, as set forth above, the terminal plate and the distal end of the lead conductor are welded together, which means that these components are joined together with a weld in an alloyed state. Thus, the terminal plate and the lead conductor can be firmly and reliably joined together. According to one embodiment, the terminal plate may have a connecting portion projecting from the plate portion and welded to the distal end of the lead conductor.

Furthermore, welding is performed outside the plate portion of the terminal plate, reducing heat transferred to the thermistor element unit from the weld between the terminal plate and the lead conductor. This prevents the deterioration of thermistor characteristics, providing the thermistor device with high reliability.

According to a second aspect of the present invention, there is provided a method for manufacturing the thermistor device, comprising the steps of:

aligning the distal end of the lead conductor with a portion of the terminal plate outside the plate portion; and welding together the terminal plate and the lead conductor.

When manufactured by the method of the present invention, the thermistor device can be provided with all the advantages described above.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

The present invention relates to a thermistor device which serves as a temperature sensor in the fields which require high reliability, such as household appliances, housing equipments, and automotive equipments.

Figure 1:
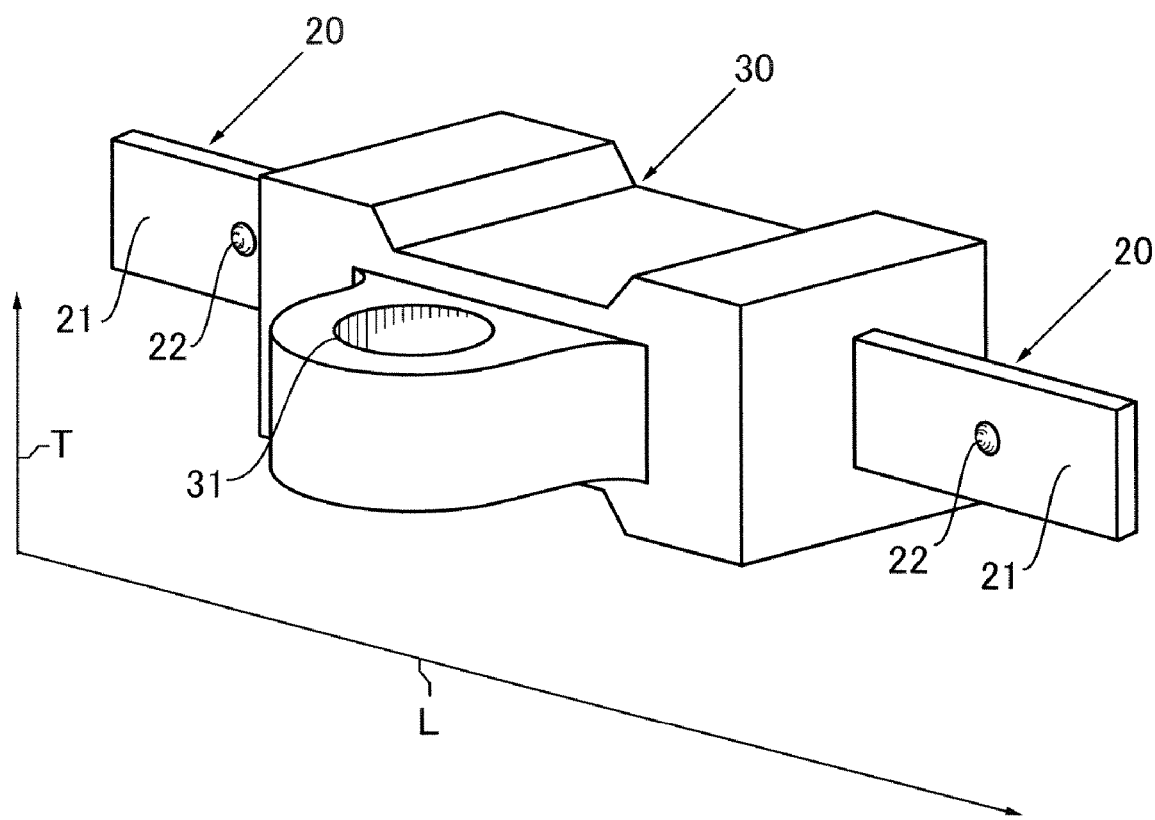
FIG. 1 is a perspective view of a thermistor device according to one embodiment of the present invention.
Figure 2:
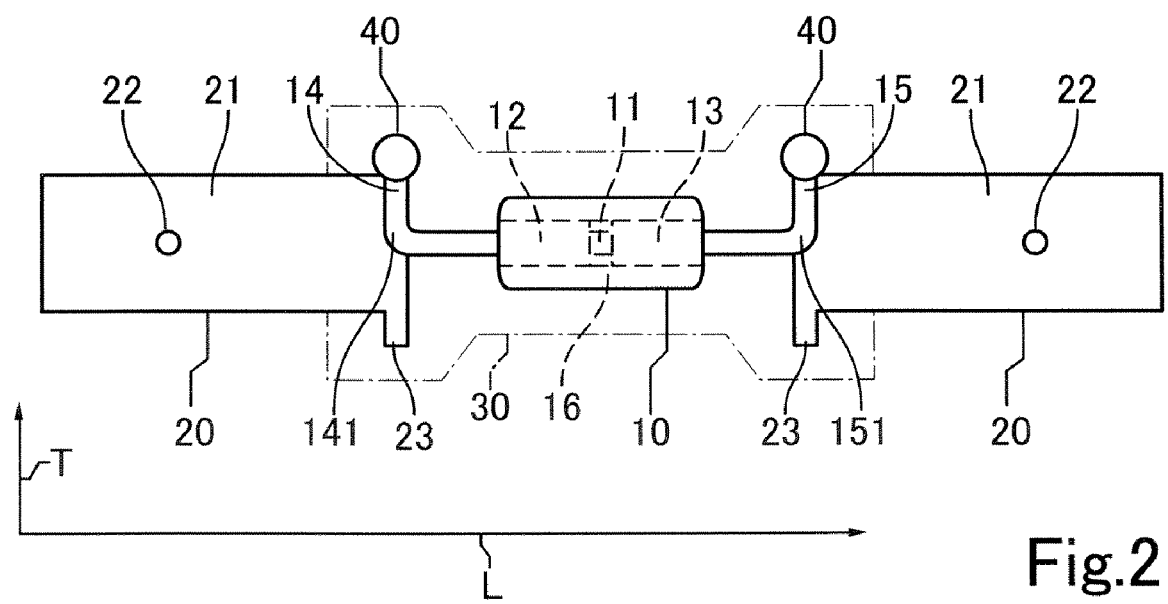
FIG. 2 is a front view showing an internal structure of the thermistor device of FIG. 1.
Figure 3:
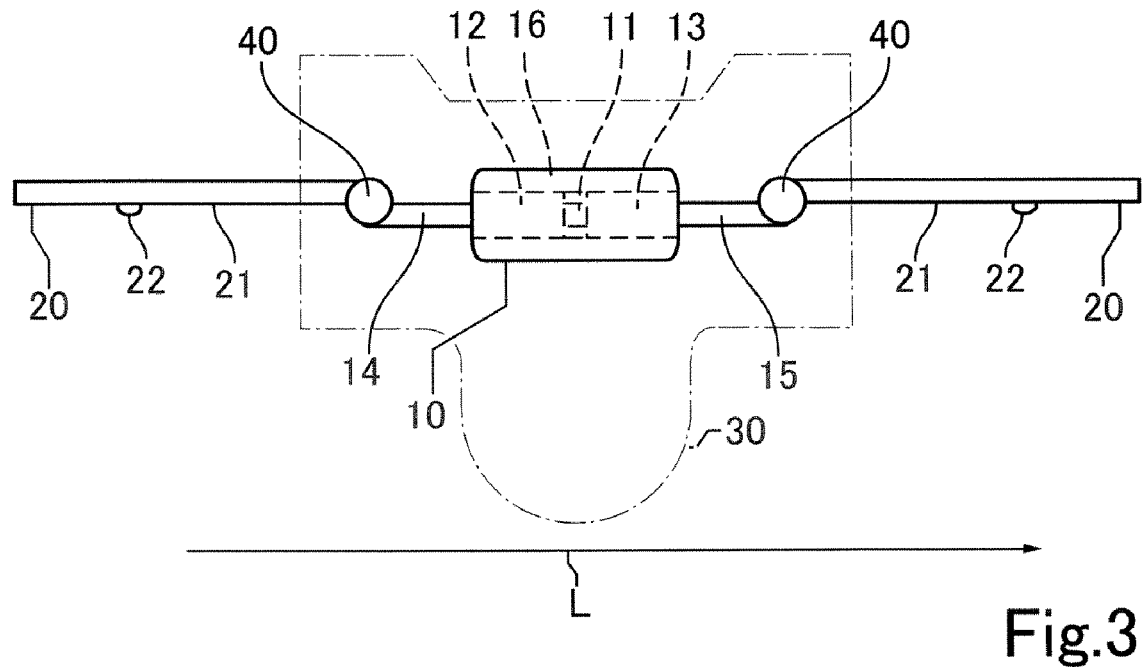
FIG. 3 is a plan view showing an internal structure of the thermistor device of FIG. 1.

Referring to FIGS. 1 to 3, a thermistor device according to one embodiment of the present invention includes a thermistor element unit 10 and a pair of terminal plates 20. As shown in FIG. 1, the whole thermistor element unit 10 (see FIGS. 2 and 3) and part of the terminal plates 20 are covered with a resin mold 30. The resin mold 30 has a through-hole 31 for attachment to a temperature sensor. The resin mold 30 improves the reliability of the thermistor device such as airtightness and mechanical strength when the thermistor device is used as a temperature sensor in household appliances, housing equipments, automotive equipments and the like.

Hereinbelow, the configuration of the thermistor element unit 10 and the terminal plate 20 will be described with reference to FIGS. 2 and 3. The thermistor element unit 10 is a so-called glass encapsulated thermistor wherein an assembly with a thermistor element 11 disposed between two dumets 12, 13, which are an alloy containing Fe, Ni as main components, is sealed by a sealing glass 16.

The thermistor element unit 10 has lead conductors 14, 15, which are preferably CP wires formed by covering Fe wires with Cu. Alternatively, the lead conductors 14, 15 may be dumet wires obtained by drawing the dumets 12, 13 out of the sealing glass 16.

The lead conductors 14, 15 illustrated in FIGS. 2 and 3 have proximal ends attached to the dumets 12, 13 and distal ends electrically connected to the terminal plates 20. At intermediate portions between the proximal ends and the distal ends, the lead conductors 14, 15 are curved to have bends 141, 151.

The terminal plate 20 is in the form of a flat strip, contains brass or phosphor bronze as a main component, and is preferably coated with an Ag plating film. The terminal plate 20 has a plate portion 21 with a projection 22 on one side thereof for external connection.

Outside the plate portion 21, the terminal plate 20 is welded to the distal ends of the lead conductors 14, 15. In more detail, the terminal plate 20 illustrated in FIGS. 1 to 3 has two connecting portions 23. These two connecting portions 23 are disposed adjacent one edge directed in a length direction L of the plate portion 21 to project from the plate portion 21 along a height direction T perpendicular to the length direction L. The connecting portions 23 have a width almost equal to the diameter of the lead conductors 14, 15. The distal ends of the lead conductors 14, 15 and corresponding ones of the connecting portions 23 are joined together in an alloyed state by local welding.

As shown in FIGS. 2 and 3, the connecting portions 23 and the distal ends of the lead conductors 14, 15 are welded together into spherical welds 40. It should be noted that the intermediate portions of the lead conductors 14, 15 are kept in non-contact with the plate portions 21.

In the thermistor device according to one embodiment of the present invention, the thermistor element unit 10 and the welds 40 are covered with the resin mold 30.

When used as a component of a temperature sensor, the thermistor device illustrated in FIGS. 1 to 3 is fixed to a temperature sensor (not shown) with a securing pin inserted in the through-hole 31 and with the projections 22 electrically connected to connecting terminals for a detection circuit (not shown). Here, the thermistor element 11 illustrated in FIGS. 1 to 3 is directed to an embodiment adopting a so-called NTC (negative temperature coefficient) thermistor, but not limited thereto. For example, it is also possible to adopt a PTC (positive temperature coefficient) thermistor.

In the thermistor device according to one embodiment of the present invention, as set forth above, the lead conductors 14, 15 are curved to provide each intermediate portion with at least one bend (141, 151). With this configuration, mechanical or thermal stress externally applied to the thermistor device can be relieved by the bends 141, 151. This improves the reliability of the thermistor device.

Since the thermistor element unit 10 is connected to the terminal plates 20 through the lead conductors 14, 15, it has an insulation effect on the thermistor element 11 corresponding to the length of the lead conductors 14, 15. This prevents the deterioration of characteristics of the thermistor element 11, providing the thermistor device with high reliability.

The terminal plate 20 has the connecting portion 23 outside the plate portion 21. These connecting portions 23 are welded to the distal ends of the lead conductors 14, 15. The resulting welds 40 are in an alloyed state, thus reliably securing the lead conductors 4, 15 to the terminal plates 20.

In the thermistor device according to one embodiment of the present invention, since the welds 40 are preferably in a spherical shape, the anchor effect of the welds 40 prevents the terminal plates 20 from coming out of the resin mold 30, thereby improving the reliability.

FIGS. 4 to 9 are diagrams showing a thermistor device manufacturing method according to one embodiment of the present invention. In FIGS. 4 to 9, the components having the same constructions as those shown in FIGS. 1 to 3 are designated by the same reference numerals.

Figure 4:
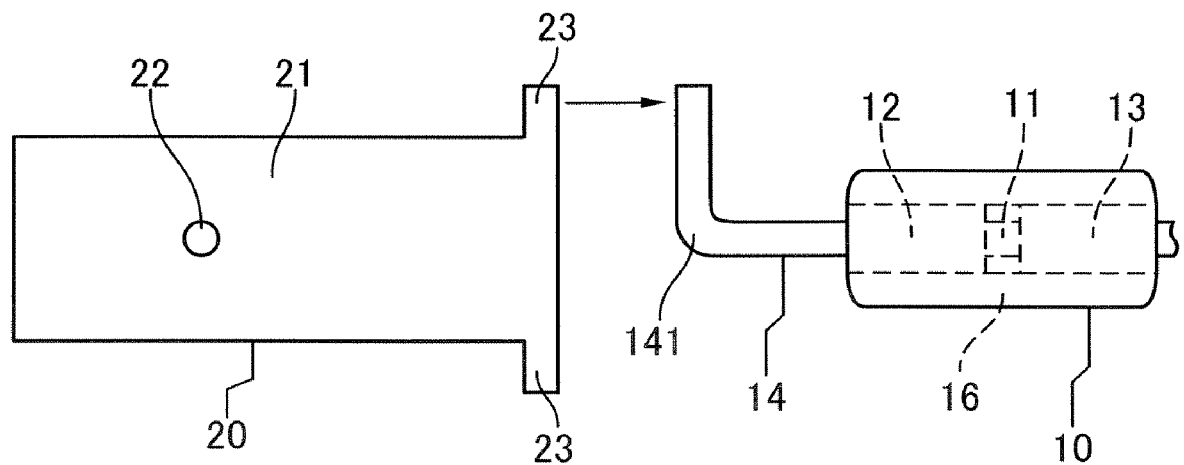
FIG. 4 is a diagram showing a step of a thermistor device manufacturing method according to one embodiment of the present invention.

Referring first to FIG. 4, the thermistor element unit 10 and the terminal plate 20 are prepared. One of the two connecting portions 23 projecting from the plate portion 21 of the terminal plate 20 is aligned with the distal end of the lead conductor 14.

Figure 5:
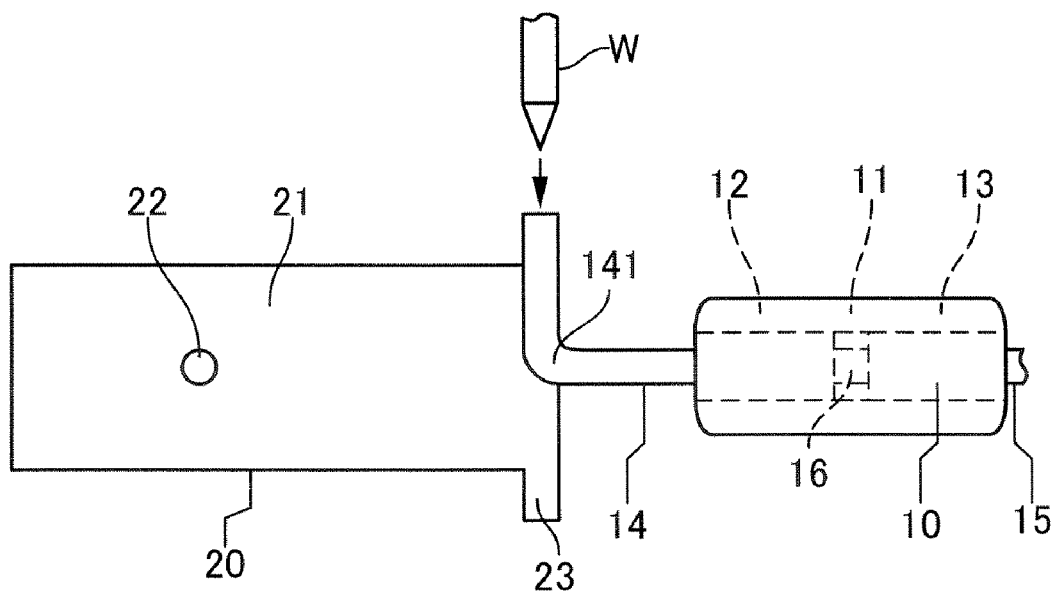
FIG. 5 is a diagram showing a step subsequent to the step of FIG. 4.
Figure 6:
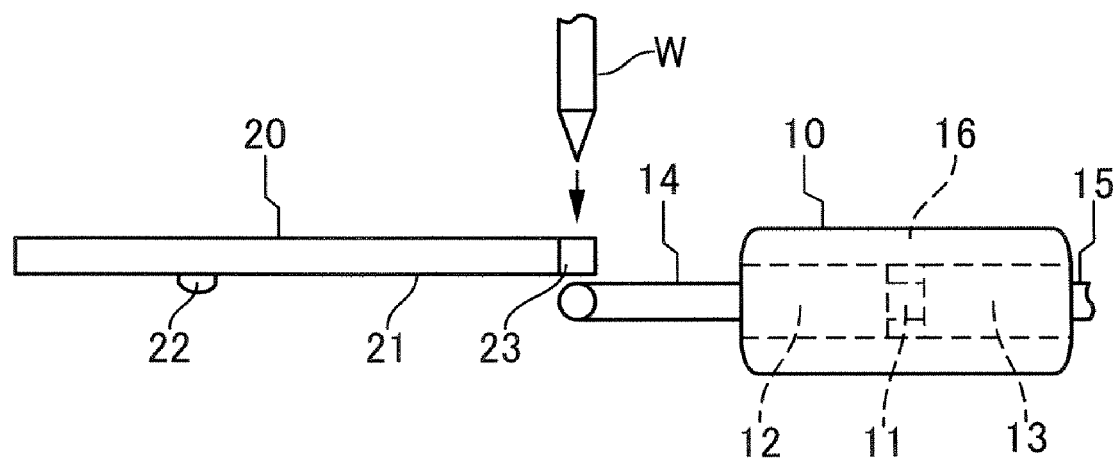
FIG. 6 is a diagram corresponding to the plan view of FIG. 3 and showing the step of FIG. 5.

Referring next to FIGS. 5 and 6, the lead conductor 14 is aligned with the terminal plate 20 in a non-contact manner. Since the width of the connecting portion 23 is almost equal to the diameter of the lead conductor 14 to be aligned therewith, the lead conductor 14 and the terminal plate 20 form a lap joint in one direction when brought into alignment with each other.

Figure 7:
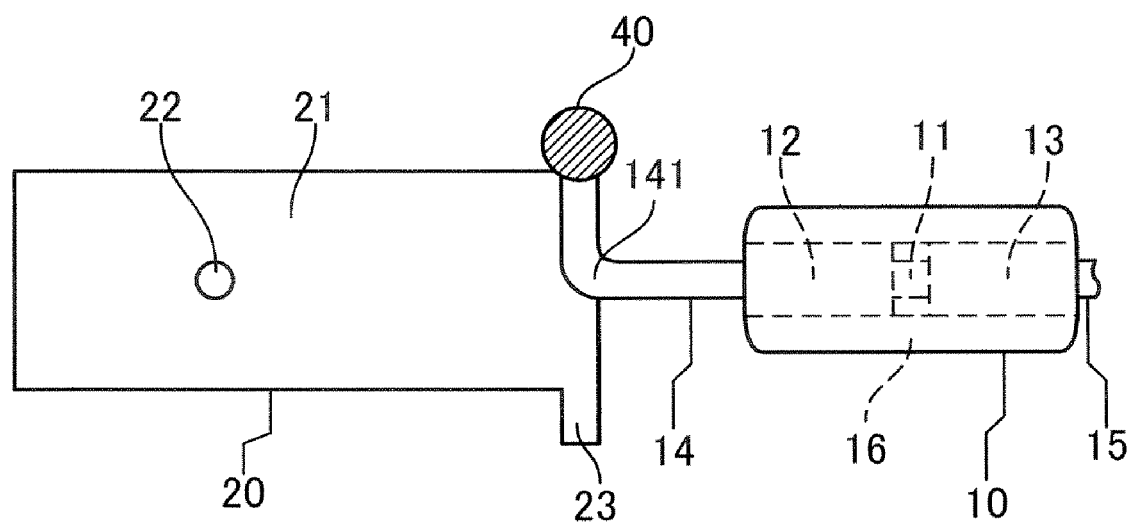
FIG. 7 is a diagram showing a step subsequent to the step of FIGS. 5 and 6.
Figure 8:
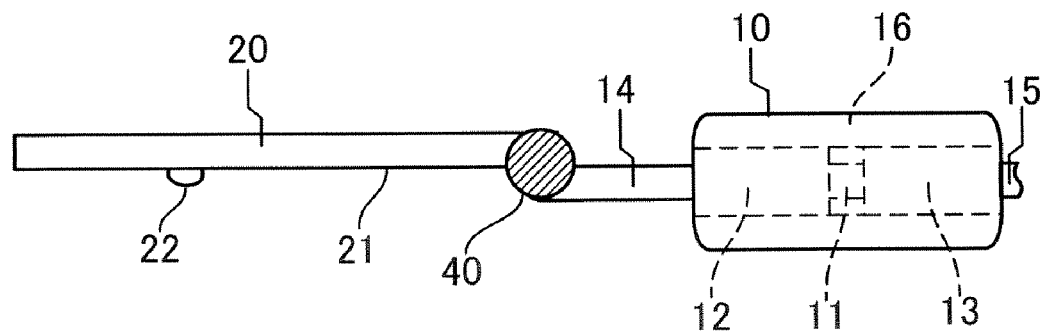
FIG. 8 is a diagram corresponding to the plan view of FIG. 3 and showing the step of FIG. 7.

Referring next to FIGS. 7 and 8, the connecting portion 23 of the terminal plate 20 and the distal end of the lead conductor 14 are welded together. Concretely, welding may be performed by arc welding or laser beam welding. From the standpoint of workability and equipment costs, preferred is arc welding. The connecting portion 23 of the terminal plate 20 and the distal end of the lead conductor 14 are joined together in an alloyed state by local welding with an arc welding torch W. The joint therebetween (i.e., the weld 40) preferably has a curved surface with a constant curvature, i.e., takes a spherical shape.

Although not shown in FIGS. 4 to 8, it will be appreciated that the distal end of the lead conductor 15 is welded to the connecting portion 23 of the terminal plate 20 in the same manner as the distal end of the lead conductor 14.

Figure 9:
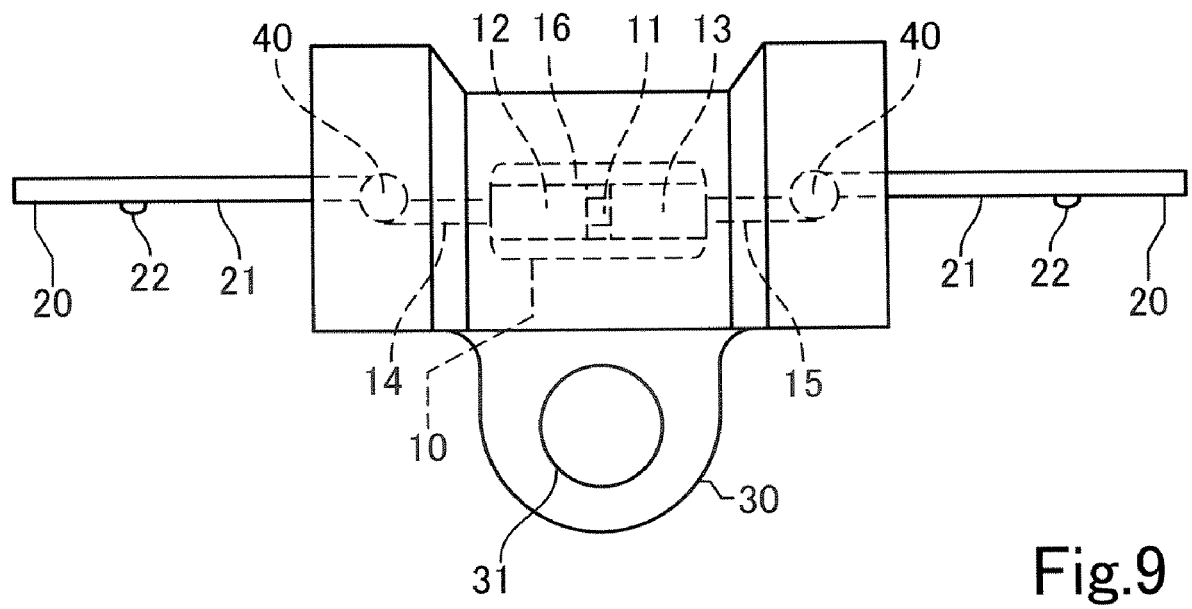
FIG. 9 is a diagram showing a step subsequent to the step of FIGS. 7 and 8.

Referring further to FIG. 9, the resin mold 30 is formed to cover the thermistor element unit 10 and the welds 40 after the welding step shown in FIGS. 7 and 8.

When manufactured by the above thermistor device manufacturing method according to one embodiment of the present invention, the thermistor device can be provided with all the advantages described with reference to FIGS. 1 to 3. For example, since the distal ends of the lead conductors 14, 15 are welded to the corresponding ones of the connecting portions 23 of the terminal plates 20 by arc welding, the electric field (or heat) generated by arc welding can be concentrated at the connecting portions 23 outside the plate portions 21, thereby ensuring formation of the welds 40. Accordingly, mechanical or thermal stress externally applied thereto hardly causes a gap due to separation or breakage at the welds 40.

When the terminal plates 20 are welded to the lead conductors 14, 15 by local welding at the connecting portions 23, furthermore, the heat radiation upon arc welding can be decreased to thereby reduce the heat transferred to the thermistor element unit 10. Since the lead conductors 14, 15 have the bends 141, 151, furthermore, a sufficient insulation distance can be ensured with respect to the thermistor element 11. Accordingly, the deterioration of thermistor characteristics during the manufacturing process can be avoided to improve the reliability.

Arc welding, which enables the lead conductors 14, 15 to be aligned with and welded to the terminal plates 20 in a non-contact manner, does not cause mechanical stress in the lead conductors 14, 15 and the terminal plates 20. Thus, these components can be welded together without affecting thermistor characteristics.

Since the connecting portions 23 are disposed adjacent one edge of the terminal plate 20, the alignment direction of the lead conductors 14, 15 with respect to the terminal plate 20 is apparent, and the alignment process itself is easy to perform.

Figure 10:
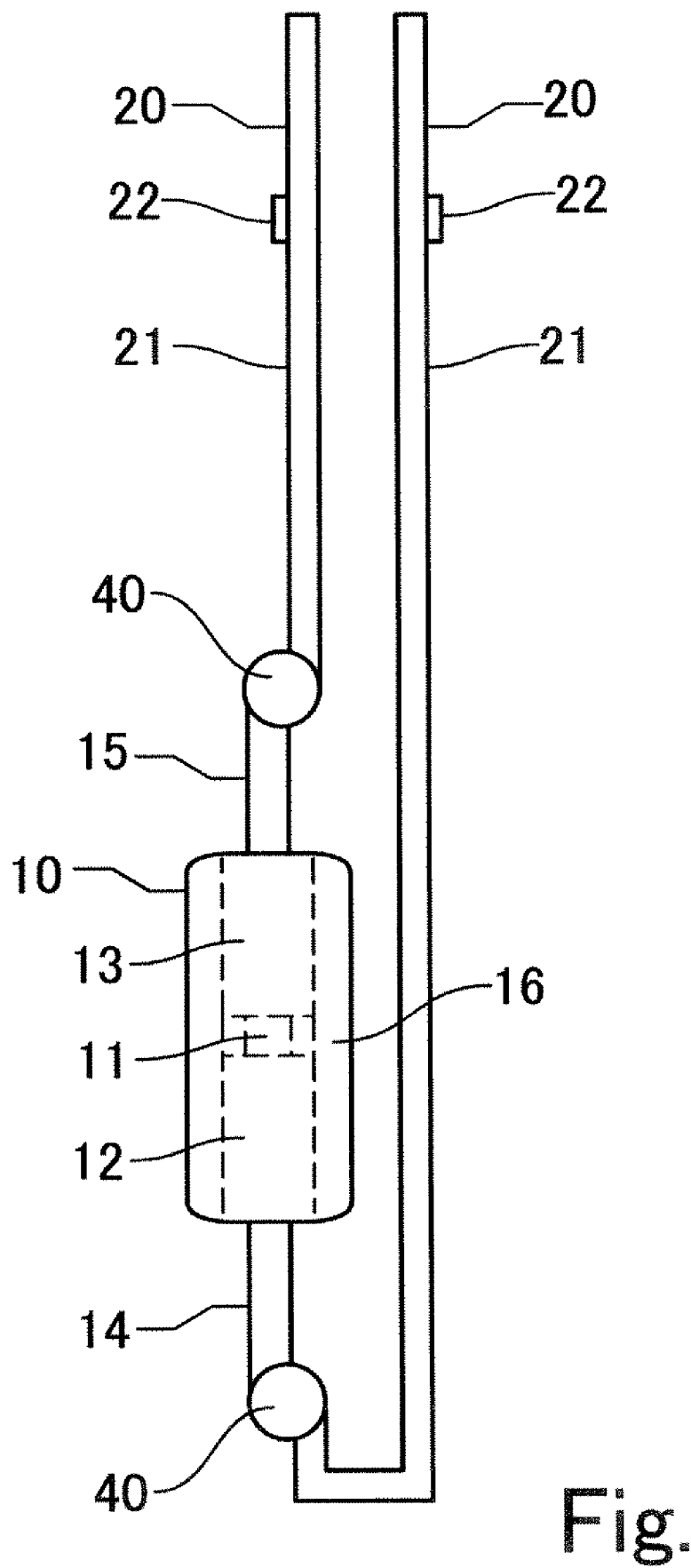
FIG. 10 is a plan view of a thermistor device according to another embodiment of the present invention.
Figure 11:
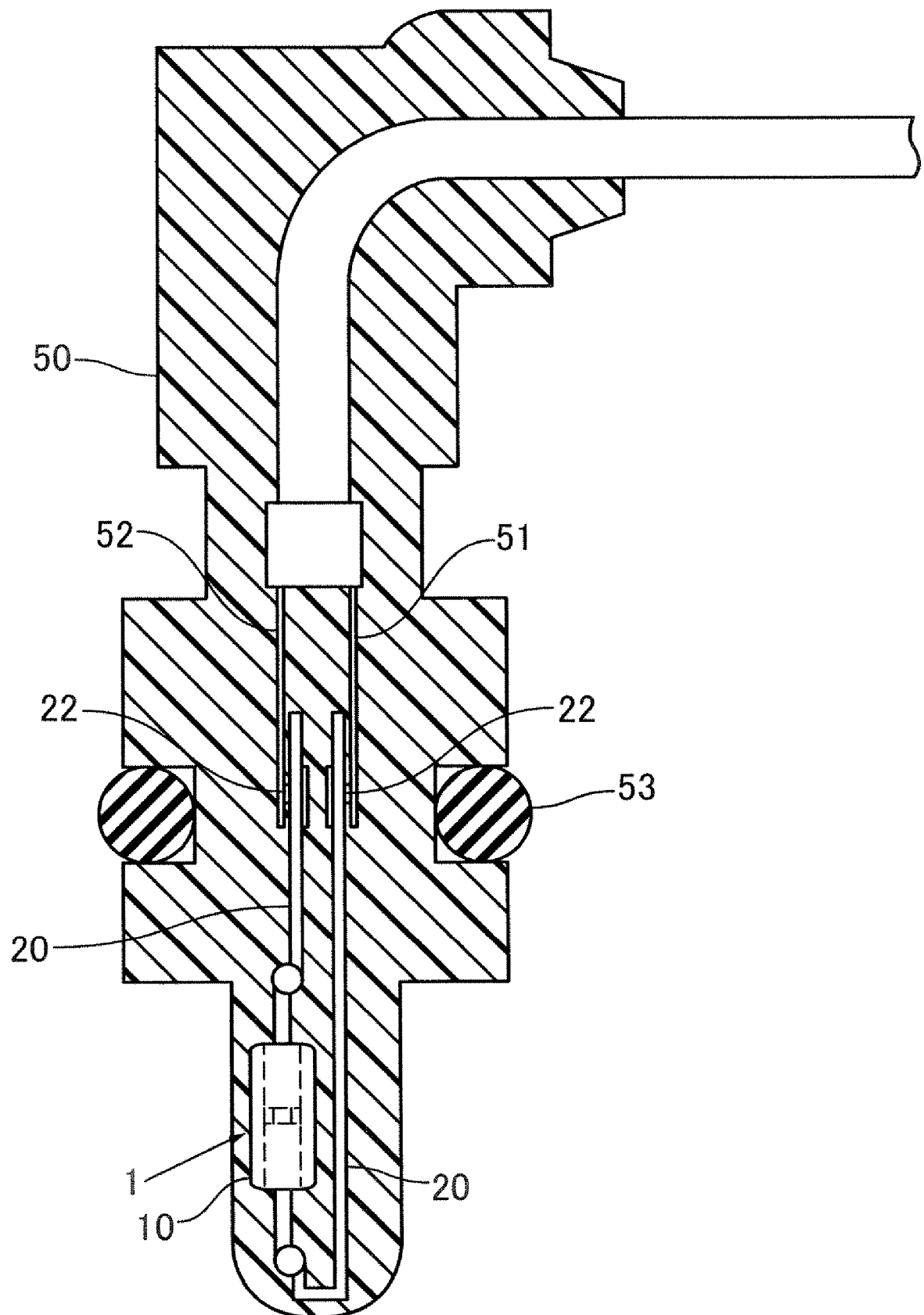
FIG. 11 is a sectional view showing a use of the thermistor device of FIG. 10.

FIG. 10 is a plan view of a thermistor device according to another embodiment of the present invention, and FIG. 11 is a sectional view showing a use of the thermistor device of FIG. 10. In FIGS. 10 to 11, the components having the same constructions as those shown in FIGS. 1 to 9 are designated by the same reference numerals.

In the embodiment illustrated in FIGS. 10 and 11, a thermistor device 1 is used as a temperature sensor in household appliances, housing equipments, automotive equipments and the like. This temperature sensor is a so-called plug-in temperature sensor of a pin-like shape, wherein the thermistor device 1 is disposed at a tip of a substrate 50 and electrically connected to an external detection circuit (not shown) through connecting terminals 51, 52. Around the plug-in portion of the substrate 50, an O-ring 53 is provided as a buffer member.

As has been described with reference to FIGS. 1 to 11, the thermistor device 1 has a basic structure common to conventional thermistor devices of this type and is characterized by adding a new twist to the joints between the lead conductors 14, 15 and the terminal plates 20. Therefore, the terminal plates 20 may be freely modified depending on the intended use of the thermistor device 1, except for the joints between the terminal plates 20 and the lead conductors 14, 15.

Considering assembly to the plug-in temperature sensor shown in FIG. 11, for example, the thermistor device 1 shown in FIG. 10 is modified to provide the terminal plate 20 with two bends for miniaturization. Hence, the thermistor device shown in FIG. 10, as well as the temperature sensor shown in FIG. 11, has all the advantages of the thermistor device described with reference to FIGS. 1 to 9.

While the present invention has been particularly shown and described with reference to embodiments thereof, it will be understood by those skilled in the art that various changes in form and detail may be made therein without departing from the spirit, scope and teaching of the invention.

What is claimed is:

1. A thermistor device comprising:
    a thermistor element unit having lead conductors at both ends in a length direction of said thermistor element unit;
    a pair of terminal plates;
    and a resin, wherein
    said lead conductors are drawn out from both ends of said thermistor element unit to extend opposite to each other in said length direction, and curved to have bends at intermediate portions between proximal ends and distal ends, said distal ends extending along a height direction perpendicular to said length direction,
    each of said pair of terminal plates includes connecting portions disposed at both ends of said thermistor element unit in said length direction,
    said connecting portions project from one end of each of said pair of terminal plates along said height direction,
    said distal ends of said lead conductors are aligned with said connecting portions, respectively, outside plate portions of each of said pair of terminal plates, and joined together in an alloyed state by welding,
    said distal ends of said lead conductors and said connecting portions are welded together into a spherical shape, and
    said resin covers said thermistor element unit, and said distal ends of said lead conductors welded to said connecting portions.

2. A method for manufacturing the thermistor device of claim 1, comprising:
    aligning said distal ends of said lead conductors with said connecting portions of said pair of terminal plates outside said plate portions; and
    welding together said distal ends of said lead conductors and said connecting portions of said pair of terminal plates.

3. The method of claim 2, wherein
    said aligning includes assuring that said intermediate portions of said lead conductors do not contact said plate portions of said pair of terminal plates.

4. The thermistor device of claim 1, wherein said thermistor element unit includes an encapsulating glass with a thermistor in said encapsulating glass, and
    said lead conductors drawn out of said encapsulating glass to extend in said length directions.

5. A method for manufacturing the thermistor device of claim 4, comprising:
    aligning said distal ends of said lead conductors with said connecting portions of said pair of terminal plates outside said plate portions; and
    welding together said distal ends of said lead conductors and said connection portions of said pair of terminal plates.

6. The method of claim 5, wherein
    said aligning includes assuring that said intermediate portions of said lead conductors do not contact said plate portions of said pair of terminal plates.

* * * * *